US012388269B2

(12) United States Patent
Mabuchi et al.

(10) Patent No.: US 12,388,269 B2
(45) Date of Patent: Aug. 12, 2025

(54) POWER CONVERTER DEVICE

(71) Applicant: Hitachi, Ltd., Tokyo (JP)

(72) Inventors: Yuuichi Mabuchi, Tokyo (JP); Kimihisa Furukawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/682,017

(22) PCT Filed: Aug. 9, 2022

(86) PCT No.: PCT/JP2022/030469
§ 371 (c)(1),
(2) Date: Feb. 7, 2024

(87) PCT Pub. No.: WO2023/026859
PCT Pub. Date: Mar. 2, 2023

(65) Prior Publication Data
US 2024/0275177 A1 Aug. 15, 2024

(30) Foreign Application Priority Data
Aug. 25, 2021 (JP) ................................ 2021-137173

(51) Int. Cl.
*H02J 3/44* (2006.01)
*H02J 3/38* (2006.01)

(52) U.S. Cl.
CPC ................ *H02J 3/44* (2013.01); *H02J 3/381* (2013.01); *H02J 3/388* (2020.01)

(58) Field of Classification Search
CPC ...... H02J 3/44; H02J 3/38; H02J 3/388; H02J 3/381
See application file for complete search history.

(56) References Cited

FOREIGN PATENT DOCUMENTS

| | | | |
|---|---|---|---|
| JP | 2004-357436 | A | 12/2004 |
| JP | 2007-129838 | A | 5/2007 |
| JP | 2009-183082 | A | 8/2009 |
| JP | 2016-025710 | A | 2/2016 |
| JP | 2018-170832 | A | 11/2018 |
| WO | 2016/162915 | A1 | 10/2016 |
| WO | 2019/030859 | A1 | 2/2019 |

OTHER PUBLICATIONS

International Search Report, PCT/JP2022/030469, Sep. 13, 2022, 2 pgs.

*Primary Examiner* — Robert L Deberadinis
(74) *Attorney, Agent, or Firm* — Volpe Koenig

(57) ABSTRACT

This power converter device is appropriately configured. Accordingly, a power converter device comprises, for each phase of a three-phase AC, an AC wiring through which AC terminals of a plurality of power conversion units are series-connected along a second direction. Among the power conversion units, power conversion units that correspond to a first phase are series-connected from a first phase line toward a neutral line in a first direction along the second direction. Among the power conversion units, power conversion units that correspond to a second phase adjacent to the first phase are series-connected from a second phase line toward the neutral line in a second direction opposite to the first direction.

2 Claims, 6 Drawing Sheets

[FIG. 1]
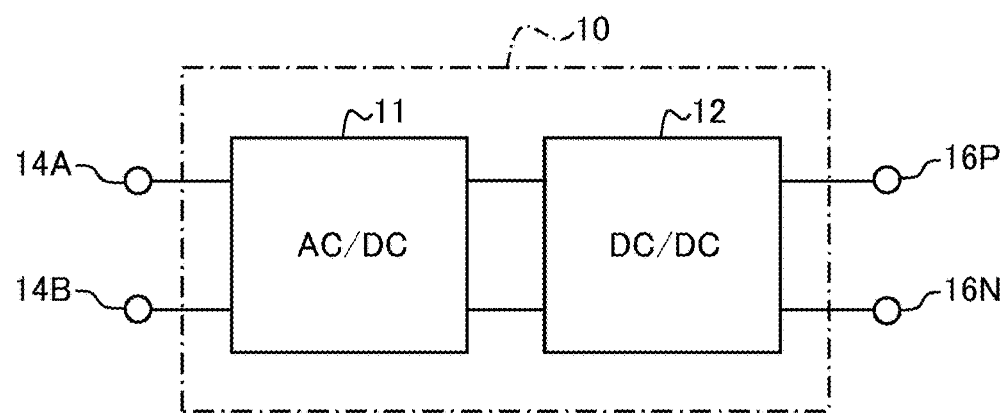
[FIG. 2]
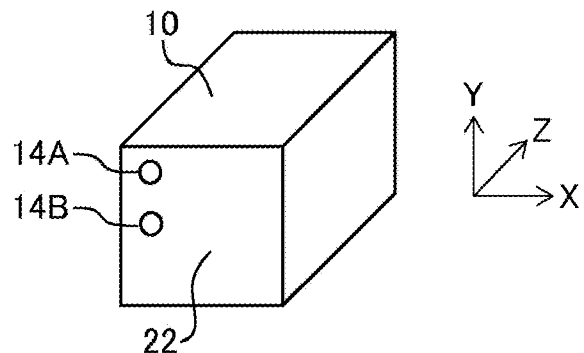
[FIG. 3]
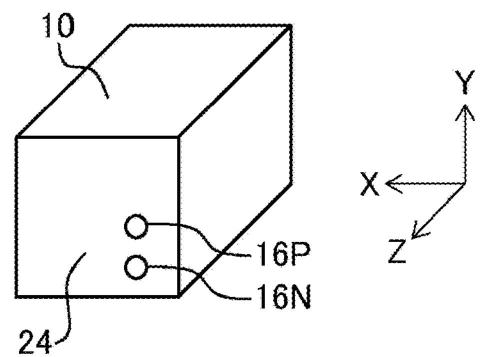

[FIG. 4]
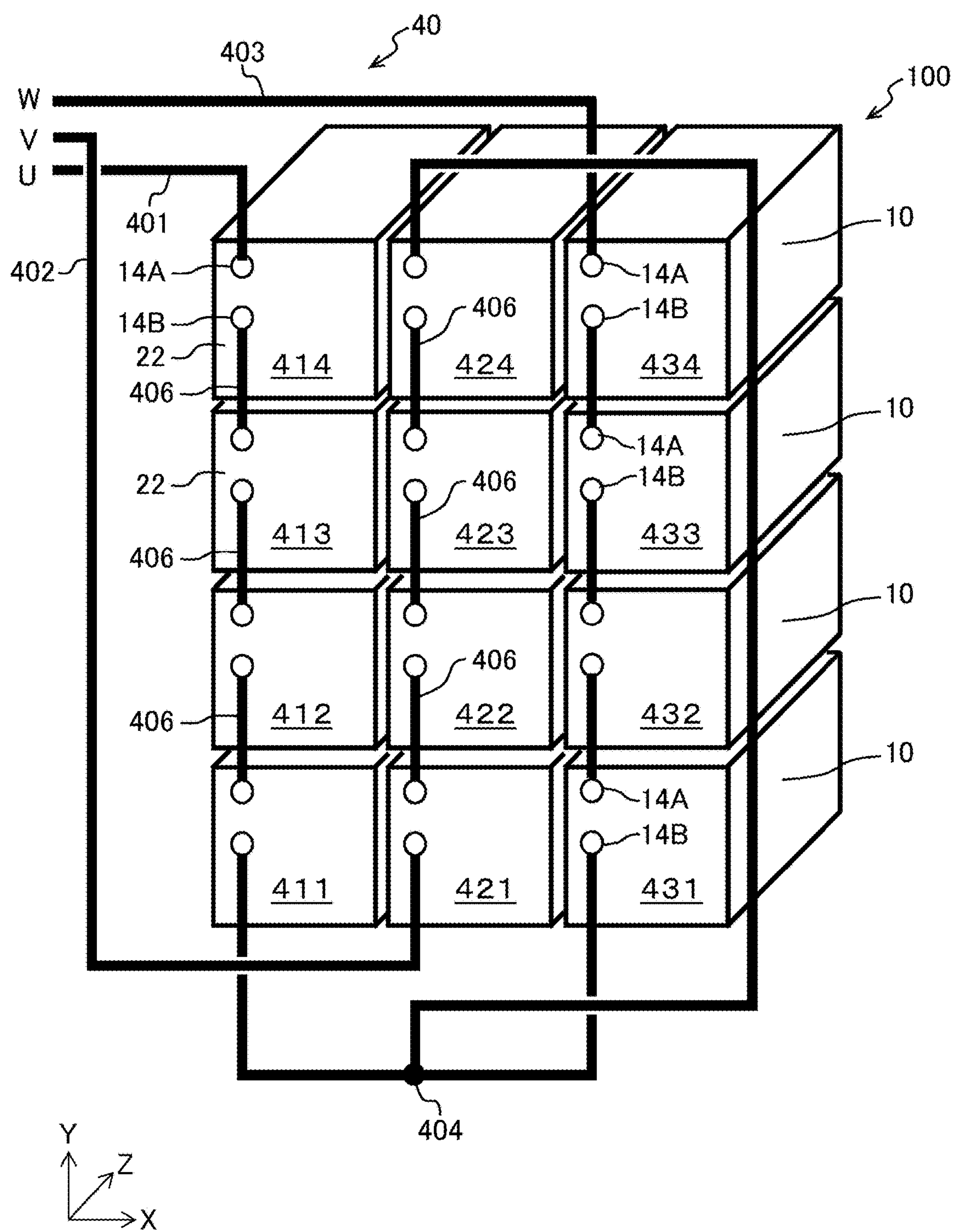

[FIG. 5]
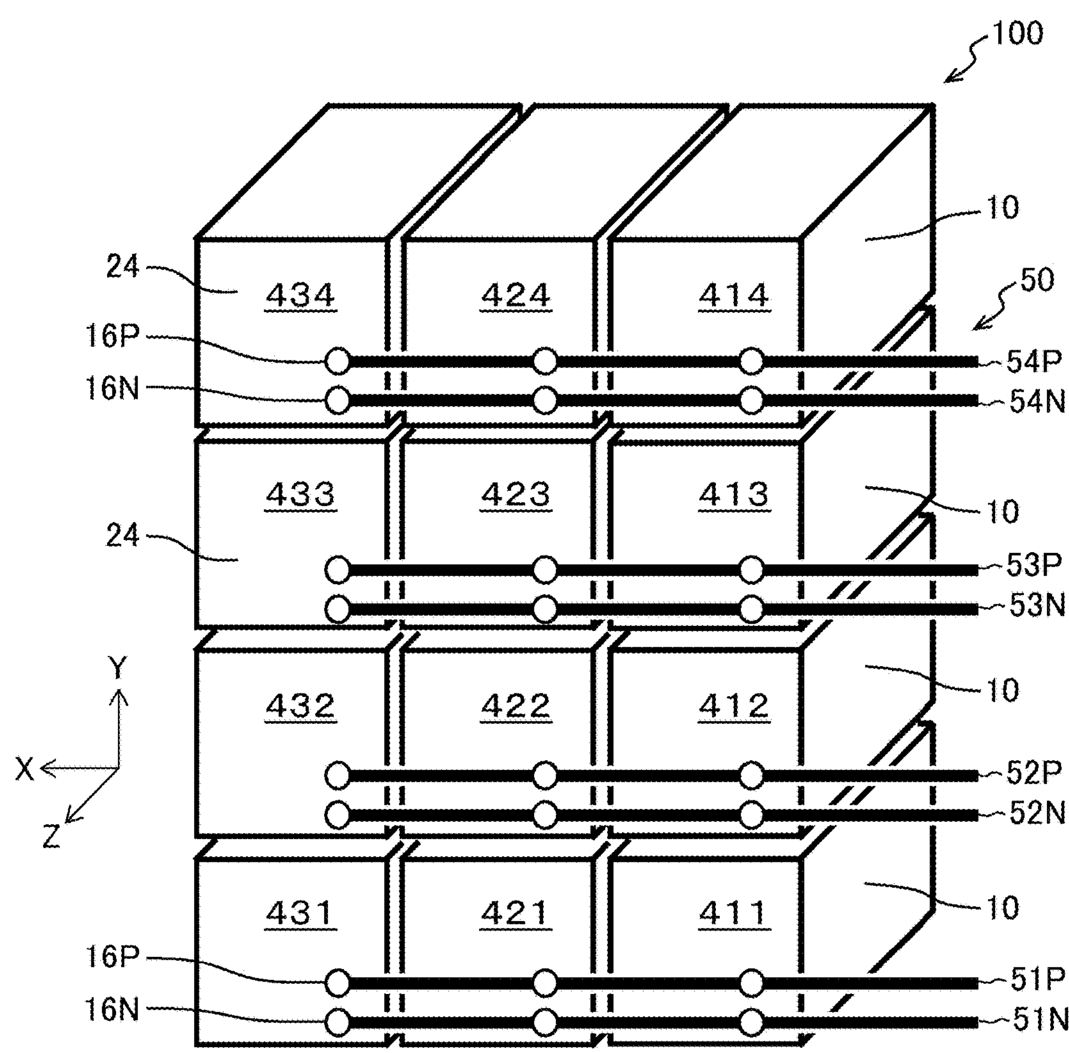

[FIG. 6]
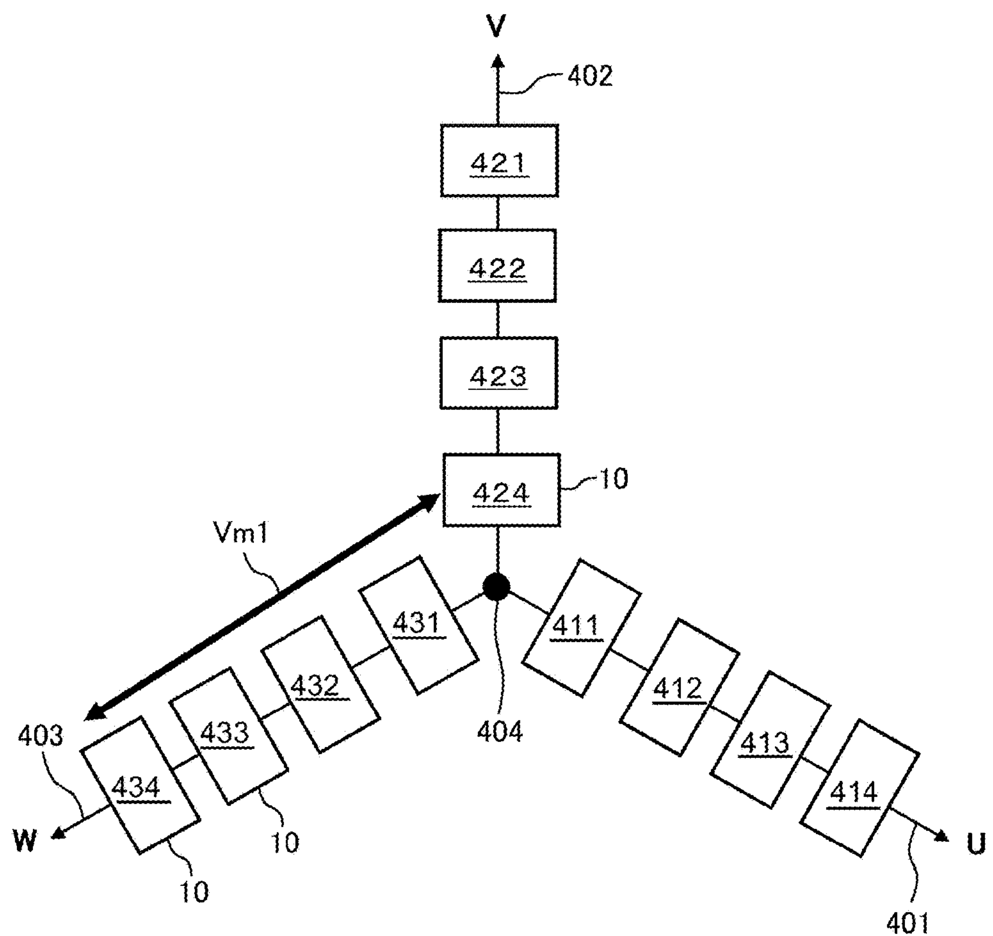

[FIG. 7]
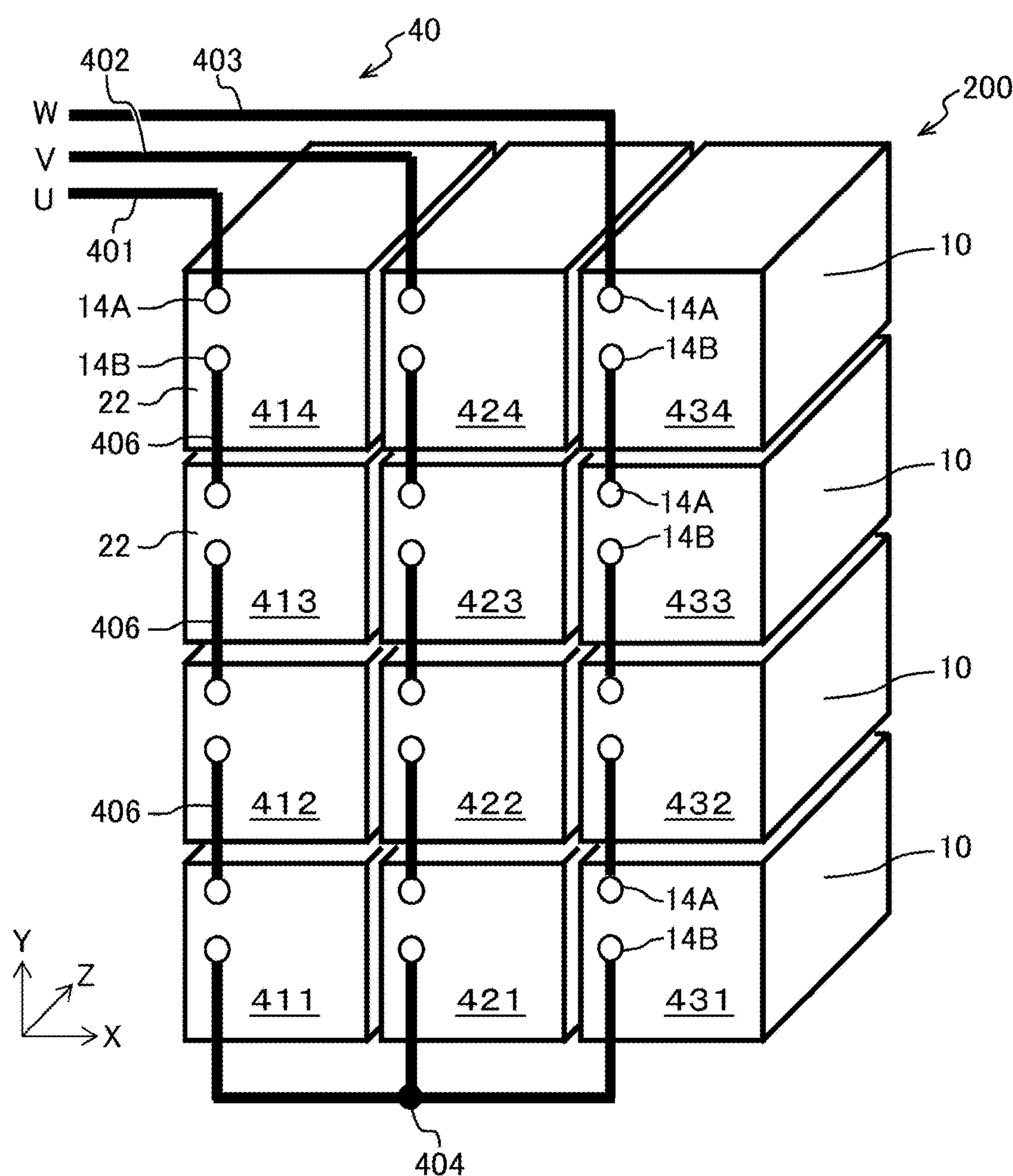

[FIG. 8]
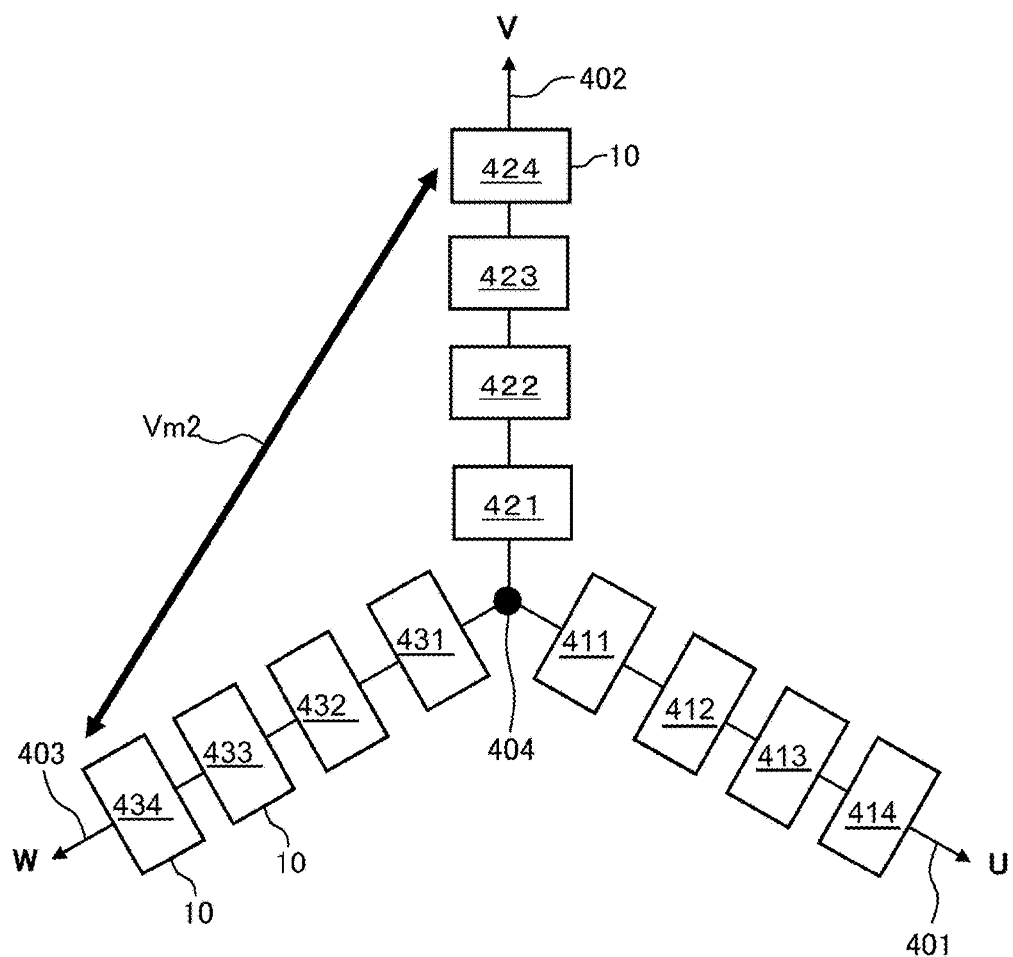

POWER CONVERTER DEVICE

TECHNICAL FIELD

The present invention relates to a power converter device.

BACKGROUND ART

As a background art of the present technical field, the abstract of the following PTL 1 describes "An input transformer 1 having a plurality of secondary windings; a transformer panel 10 that houses: the input transformer 1; a three-phase inverter each phase of which is configured such that a plurality of series-connected unit inverters 2 that are each connected to the secondary windings on a one-to-one basis and each output a single-phase AC voltage of a desired frequency and in which three of the phases are Y-connected; and a converter panel 20 that houses the unit inverters 2 constituting the three-phase inverter, wherein the converter panel 20 has a plurality of support pillars 22 made of insulator and a plurality of metal shelf plates 23 that laterally fasten neighboring support pillars of the plurality of support pillars 22, and the unit inverters 2 are each placed and fixed on the shelf plates 23.".

The abstract of PTL 2 below describes "a power conversion device according to an embodiment includes: a power converter including a leg that includes a plurality of unit converters connected in series and in which respective capacitors are charged and discharged by switching; a first disconnector connected between one end of the leg and a ground; a second disconnector connected between the other end of the leg and the ground; and a disconnection signal generation unit that supplies a disconnection signal to the first disconnector and the second disconnector. Each of the unit converters includes a first resistor and a second resistor connected in series to the first resistor. The capacitor is connected in parallel to a series connection body of the first resistor and the second resistor. After the power converter is stopped, the disconnection signal generation unit causes the first disconnector and the second disconnector to be conductive, by the disconnection signal.".

CITATION LIST

Patent Literatures

PTL 1: JP 2004-357436 A
PTL 2: JP 2018-170832 A

SUMMARY OF INVENTION

Technical Problem

Incidentally, there is a demand for more appropriately configuring the power converter device in the above-described technology.

The present invention has been made in view of the above circumstances, and an object of the invention is to provide a power converter device that can be appropriately configured.

Solution to Problem

In order to solve the above issue, a power converter device includes: a plurality of power conversion units each including a pair of alternating-current terminals and a power conversion circuit that performs power conversion on power input or output from the alternating-current terminals, the plurality of power conversion units being arranged along a first direction and a second direction different from the first direction; and alternating-current wires that connect in series along the second direction the alternating-current terminals, of the plurality of power conversion units, for each phase of three-phase alternating current, wherein power conversion units, of the power conversion units, corresponding to a first phase are connected in series in a first orientation along the second direction from a first phase line toward a neutral line, power conversion units, of the power conversion units, corresponding to a second phase adjacent to the first phase are connected in series in a second orientation opposite to the first orientation from a second phase line toward the neutral line, and power conversion units, of the power conversion units, corresponding to a third phase adjacent to the second phase are connected in series in the first orientation from a third phase line toward the neutral line.

Advantageous Effects of Invention

The present invention enables the power converter device to be appropriately configured.

BRIEF DESCRIPTION OF DRAWINGS

FIG. 1 is a diagram illustrating a circuit configuration of a power conversion unit applied to a first embodiment.

FIG. 2 is a schematic perspective view of the power conversion unit as viewed from the front side.

FIG. 3 is a schematic perspective view of the power conversion unit as viewed from the back side.

FIG. 4 is a schematic perspective view of the power converter device according to the first embodiment as viewed from the front side.

FIG. 5 is a schematic perspective view of the power converter device as viewed from the back side.

FIG. 6 is a schematic vector diagram illustrating a voltage appearing on alternating-current wires.

FIG. 7 is a schematic perspective view of a power converter device according to a comparative example as viewed from the front side.

FIG. 8 is a schematic vector diagram illustrating a voltage appearing on alternating-current wires in the comparative example.

DESCRIPTION OF EMBODIMENTS

Outline of Embodiment

When the contents of PTLs 1 and 2 described above are applied, it is considered that a multi-level power conversion device that mutually converts three-phase power and direct-current power can be configured by connecting power conversion units in series. The three-phase alternating-current voltage applied to this type of power conversion device is often a high voltage of about several kV to several tens of kV. Therefore, particularly regarding input and output points of the three-phase alternating current, an insulation design needs to be performed in consideration of voltages between lines, and there arises a problem that the power conversion device is accordingly larger. Therefore, an embodiment to be described later is intended to downsize the power conversion device by reducing the voltages between adjacent power conversion units.

First Embodiment

FIG. 1 is a diagram illustrating a circuit configuration of a power conversion unit 10 applied to a first embodiment.

In FIG. 1, the power conversion unit 10 includes an alternating current to direct current (AC/DC) conversion circuit 11 (power conversion circuit), a direct current to direct current (DC/DC) conversion circuit 12 (power conversion circuit), a pair of alternating-current (AC) terminals 14A and 14B, and a pair of direct-current (DC) terminals 16P and 16N. In the following description, the power conversion unit 10 is sometimes simply referred to as "unit". The AC/DC conversion circuit 11 and the DC/DC conversion circuit 12 are each sometimes simply referred to as "circuit". In addition, the alternating-current terminals 14A and 14B and the direct-current terminals 16P and 16N are each sometimes simply referred to as "terminal".

When a power flow is directed from the terminals 14A and 14B to the terminals 16P and 16N, the AC/DC conversion circuit 11 converts single-phase alternating-current power supplied from the terminals 14A and 14B into direct-current power and supplies the direct-current power to the DC/DC conversion circuit 12. In addition, the DC/DC conversion circuit 12 steps down the DC voltage supplied from the AC/DC conversion circuit 11 and outputs the stepped-down DC voltage from the direct-current terminals 16P and 16N. Conversely, when the power flow is directed from the terminals 16P and 16N to the terminals 14A and 14B, the circuit 12 steps up direct-current power input from the terminals 16P and 16N and supplies the stepped-up direct-current power to the circuit 11. In addition, the circuit 11 converts the supplied direct-current power into alternating-current power and outputs the alternating-current power from the terminals 14A and 14B.

The DC/DC conversion circuit 12 is an insulation type conversion circuit. That is, although not illustrated, the DC/DC conversion circuit 12 includes: an isolation transformer; and bridge circuits each connected to one of a primary side and a secondary side of the transformer. These bridge circuits function as an inverter or a synchronous rectifier circuit in accordance with the direction of the power flow.

FIG. 2 is a schematic perspective view of the power conversion unit 10 as viewed from the front side.

In FIG. 2, an X-axis (first direction), a Y-axis (second direction), and a Z-axis are axes orthogonal to each other. For example, the X axis is a horizontal direction, the Y axis is a vertical direction, and the Z axis is a depth direction. The unit 10 is formed in a substantially rectangular parallelepiped shape, and a front face plate 22 (first face) is formed in a substantially rectangular plate shape. On the front face plate 22 there are arranged the alternating-current terminals 14A and 14B along the Y-axis direction.

FIG. 3 is a schematic perspective view of the power conversion unit 10 as viewed from the back side.

Back face plate 24 (second face) of the unit 10 is also formed in a substantially rectangular plate shape. On the back face plate 24 there are also arranged the direct-current terminals 16P and 16N along the Y-axis direction.

FIG. 4 is a schematic perspective view of the power converter device 100 according to the first embodiment as viewed from the front side.

The power converter device 100 includes a plurality of the units 10. These units 10 are two-dimensionally arranged along the X-axis direction (first direction) and the Y-axis direction (second direction). In the illustrated example, the power converter device 100 includes totally 12 number units 10 in three rows in the X-axis direction and four rows in the Y-axis direction. The positions of these units 10 are expressed in a format of "4xy". Here, x is a coordinate value (1, 2, or 3) in the X-axis direction, and y is a coordinate value (1, 2, 3, or 4) in the Y-axis direction.

A wire 401 (first phase line) and a wire 403 (third phase line) are respectively connected to the terminals 14A of the units 10 on the left position 414 and the right position 434 on the uppermost end. A wire 402 (second phase line) is connected to the terminal 14B of the unit 10 at the central position 421 on the lowermost end. In the present specification, the term "wire" has a meaning including a coated cable, a non-coated cable, a bus bar, and the like.

A wire 404 (neutral line) is connected to the terminals 14B of the units 10 at the left position 411 and the right position 431 on the lowermost end. The wire 404 is also connected to the terminal 14A of the unit 10 at the central position 424 of the uppermost end. In addition, a total of nine (3×3) wires 406 are provided between the wires 404 and the wires 401 and 403. These wires 406 connect the terminal 14B on the upper stage side (for example, at the position 434) and the terminal 14A on the lower stage side (for example, at the position 433).

As a result, the unit 10 at the positions 411 to 414 are sequentially connected in series between the wire 404, which is the neutral line, and the wire 401 of a U phase via the terminals 14A and 14B provided on the front face plates 22. Similarly, the units 10 at the positions 431 to 434 are sequentially connected in series between the wire 404 and the wire 403 of a W phase via the terminals 14A and 14B provided on the front face plates 22.

The units 10 at the positions 421 to 424 are sequentially connected in series between the wire 402 of a V phase and the wire 404, which is the neutral line, via the terminals 14A and 14B provided on the front face plates 22. That is, the connection order of the units 10 at the positions 421 to 424 related to the V phase is opposite to the connection orders of the units 10 at the positions 411 to 414 and the positions 431 to 434 related to the U phase and the W phase. The above-described wires 401 to 406 are sometimes collectively referred to as "alternating-current wires 40". As illustrated in the drawing, the alternating-current wires 40 are arranged in parallel and linearly along the Y-axis direction.

FIG. 5 is a schematic perspective view of the power converter device 100 as viewed from the back side.

In FIG. 5, regarding the units 10 at the positions 411, 421, and 431 at the lowermost stage, the terminals 16P on the positive sides on the back face plates 24 are connected to a wire 51P, and the terminals 16N on the negative sides are connected to a wire 51N. Similarly, regarding the units 10 at the second positions 412, 422, and 432 from the lowermost stage, the terminals 16P on the positive sides on the back face plates 24 are connected to a wire 52P, and the terminals 16N on the negative sides are connected to a wire 52N.

Similarly, regarding the units 10 at the third positions 413, 423, and 433 from the lowermost stage, the terminals 16P on the positive sides on the back face plates 24 are connected to a wire 53P, and the terminals 16N on the negative sides are connected to a wire 53N. Similarly, regarding the units 10 at the positions 414, 424, and 434 on the uppermost stage, the terminals 16P on the positive sides on the back face plates 24 are connected to a wire 54P, and the terminals 16N on the negative sides are connected to a wire 54N. The wires 51P to 54P and 51N to 54N described above are sometimes collectively referred to as "direct-current wires 50".

In the example illustrated in FIGS. 4 and 5, the number of stages of the units 10 connected in series to each of the U, V, and W phases is "four", but the number of stages of the units 10 is not limited to "four". In the example described above, with respect to each of the units 10, the alternating-current terminals 14A and 14B are disposed on the front face plate 22, and the direct-current terminals 16P and 16N are disposed on the back face plate 24. However, the surface on which the terminals 16P and 16N are arranged only needs to be a surface different from the surface on which the terminals 14A and 14B are arranged and is not limited to the above example.

FIG. 6 is a schematic vector diagram illustrating a voltage appearing on the alternating-current wires 40.

The voltage Vm1 shown in the drawing is a voltage appearing between the alternating-current terminals 14A of the two units 10 at the positions 424 and 434 adjacent in the X-axis direction. As illustrated in the drawing, the voltage Vm1 has a value equal to a phase voltage. The voltages other than the voltage Vm1 are not illustrated; however, with respect to any of the alternating-current wires 40 adjacent in the X-axis direction, the voltage appearing in the adjacent pair of alternating-current wires 40 has a value equal to the phase voltage or a value equal to or less than the phase voltage.

Comparative Example

Next, in order to clarify the effect of the above embodiment, a comparative example will be described. Note that, in the following description, portions corresponding to respective ones of the portions of the above-described embodiment are denoted by the same reference numerals, and the description thereof is sometimes omitted.

FIG. 7 is a schematic perspective view of a power converter device 200 according to the comparative example as viewed from the front side.

The power converter device 200 includes totally 12 number of units 10 similarly to the power converter device 100 (see FIG. 4) according to the first embodiment. The connection state of the alternating-current wires 40 with respect to the units 10 of the U phase at the positions 411 to 414 and the units 10 of the W phase at the positions 431 to 434 of the power converter device 200 are similar to that in the above power converter device 100.

However, the connection state of the alternating-current wires 40 with respect to the units 10 of the V phase at the positions 421 to 424 is opposite to that of the power converter device 100. That is, the wire 402 of the V phase is connected to the alternating-current terminal 14A of the unit 10 at the central position 424 at the uppermost end. The wire 404 at a neutral point is connected to the terminal 14B of the unit 10 at the central position 421 on the lowermost end. The configuration of the power converter device 200 other than that described above is similar to that of the power converter device 100 of the first embodiment.

FIG. 8 is a schematic vector diagram illustrating a voltage appearing on alternating-current wires 40 in the comparative example.

The voltage Vm2 shown in the drawing is a voltage appearing between the alternating-current terminals 14A of the two units 10 at the positions 424 and 434 adjacent in the X-axis direction. As illustrated in the drawing, the voltage Vm2 has a value equal to 3 times the phase voltage. That is, the voltage Vm2 is 3 times the voltage Vm1 in the first embodiment. Accordingly, in the comparative example, it is necessary to set a distance between each unit 10 in the X-axis direction so as to secure an insulation distance in accordance with the voltage Vm2. As a result, the power converter device 200 of the comparative example has a problem of being larger than the power converter device 100 of the first embodiment.

Effects of Embodiment

As described above, in the power converter device 100 of the above embodiment, power conversion units 10, of the power conversion units 10, corresponding to the first phase (U phase) are connected in series in the first orientation (−Y) along the second direction (Y) from the first phase line (401) toward the neutral line (404), power conversion units 10, of the power conversion units 10, corresponding to the second phase (V phase) adjacent to the first phase (U phase) are connected in series in the second orientation (+Y) opposite to the first orientation (−Y) from the second phase line (402) toward the neutral line (404), and power conversion units 10, of the power conversion units 10, corresponding to the third phase (W phase) adjacent to the second phase (V phase) are connected in series in the first orientation (−Y) from the third phase line (403) towards the neutral line (404).

As a result, the maximum value of the voltage difference generated between the alternating-current wires 40 can be suppressed, and the power converter device 100 can be appropriately configured, for example, the power converter device 100 can be downsized. For example, as compared with the power converter device 200 according to the above-described comparative example, the maximum value of the voltage difference generated between the alternating-current wires 40 can be reduced to "$1/\sqrt{3}$" in the above-described embodiment. As a result, a creepage distance and a spatial distance for securing insulation can be reduced as compared with the comparative example, and the power converter device 100 can be downsized.

Furthermore, it is more preferable that the alternating-current wires 40 be arranged in parallel and linearly along the second direction (Y). As a result, the creepage distance and the spatial distance for securing insulation can be efficiently utilized, and the power converter device 100 can be further downsized.

Modified Example

The present invention is not limited to the above-described embodiment, and various modifications can be made. The above-described embodiment is exemplified for easy understanding of the present invention, and the present invention is not necessarily limited to an embodiment including all the described configurations. Furthermore, another configuration may be added to the configuration of the above embodiment, and a part of the configuration can be replaced with another configuration. In addition, the control lines and the information lines illustrated in the drawings indicate what is considered to be necessary for the description, and do not necessarily indicate all the control lines and the information lines necessary for the product. Actually, it may be considered that almost all the components are connected to each other. Examples of a possible modification to the above embodiment include the followings.

(1) In each of the above embodiments, the power conversion units 10 perform bidirectional power conversion between the alternating-current terminals 14A and 14B and the direct-current terminals 16P and 16N. However, the power conversion units 10 may perform unidirectional power conversion. Furthermore, the power conversion units

10 may input and output a single-phase alternating current and perform frequency conversion and voltage conversion.

REFERENCE SIGNS LIST

10 power conversion unit
11 AC/DC conversion circuit (power conversion circuit)
12 DC/DC conversion circuit (power conversion circuit)
14A, 14B alternating-current terminal
40 alternating-current wire
100 power converter device
401 wire (first phase line)
402 wire (second phase line)
403 wire (third phase line)
404 wire (neutral line)
X axis (first direction)
Y axis (second direction)

The invention claimed is:

1. A power converter device comprising:

a plurality of power conversion units each including a pair of alternating-current terminals and a power conversion circuit that performs power conversion on power input or output from the alternating-current terminals, the plurality of power conversion units being arranged along a first direction and a second direction different from the first direction; and alternating-current wires that connect, in series along the second direction, the alternating-current terminals, of the plurality of power conversion units, for each phase of three-phase alternating current, wherein power conversion units, of the power conversion units, corresponding to a first phase are connected in series in a first orientation along the second direction from a first phase line toward a neutral line, power conversion units, of the power conversion units, corresponding to a second phase adjacent to the first phase are connected in series in a second orientation opposite to the first orientation from a second phase line toward the neutral line, and power conversion units, of the power conversion units, corresponding to a third phase adjacent to the second phase are connected in series in the first orientation from a third phase line toward the neutral line.

2. The power converter device according to claim 1, wherein the alternating-current wires are arranged in parallel and linearly along the second direction.

* * * * *